United States Patent [19]

Brenner

[11] Patent Number: 5,600,329

[45] Date of Patent: Feb. 4, 1997

[54] DIFFERENTIAL SATELLITE POSITIONING SYSTEM GROUND STATION WITH INTEGRITY MONITORING

[75] Inventor: Mats A. Brenner, Plymouth, Minn.

[73] Assignee: Honeywell Inc., Minneapolis, Minn.

[21] Appl. No.: 497,995

[22] Filed: Jun. 30, 1995

[51] Int. Cl.⁶ .............................. A01S 5/02; H04B 7/185; G01C 21/00; G06F 7/70
[52] U.S. Cl. ..................... 342/357; 364/424.06; 340/979
[58] Field of Search ........................... 342/357, 33, 407; 364/424.06; 340/979

[56] References Cited

U.S. PATENT DOCUMENTS 4,894,655  1/1990  Joguet et al. ........................... 342/357

OTHER PUBLICATIONS

Kovach et al, "The ARINC Veracious Differential Reference Station Concept and Status", pp. 143–152, Conference Proceedings, National Telesystems Conference, 1993.

Vallot et al, "Design and Flight Test of a Differential GPS/Inertial Navigation System For Approach/Landing Guidance" Navigation, Jrn. of Inst. of Nav., vol. 38, #2, Summer 1991.

Primary Examiner—Gregory C. Issing
Attorney, Agent, or Firm—Charles J. Ungemach; Robert A. Pajak

[57] ABSTRACT

In the present invention, a plurality of DGPS receivers are employed to determine receiver-satellite-specific differential correction values. In turn, satellite-specific differential correction values are determined as an average of the individual receiver-satellite-specific differential correction values for each of the tracked satellites. A discriminator is employed for determining a receiver-satellite-specific discriminant which may be sampled and subsequent determination of a receiver-satellite-specific statistical value thereof. The receiver-satellite-specific statistical values may then be employed for determination of a Detection Threshold value and other integrity information associated with each of the satellite-specific differential correction values. The ground station further includes a means for communicating the satellite-specific differential correction values and integrity information associated therewith to a DGPS airborne receiver.

An DGPS airborne system in accordance with the present invention is configured to include a mechanization for receiving the satellite-specific differential correction values and integrity information associated therewith. An airborne integrity monitoring system may then be employed to derive particular integrity limit values associated with the DGPS derived position for pilot awareness as to whether or not the pilot should rely upon the DGPS solution for a precision landing.

12 Claims, 7 Drawing Sheets

DIFFERENTIAL SATELLITE POSITIONING SYSTEM GROUND STATION WITH INTEGRITY MONITORING

BACKGROUND OF THE INVENTION

1. Field of the Invention

The present invention is related to differential GPS systems, and more particularly, to a DGPS system employing integrity monitoring.

2. Description of the Related Art

Satellite positioning systems, commonly referred to as global positioning systems or simply GPS, are now well-known in the art. Such specific systems, for example, NAVSTAR-GPS, are rapidly being used for determination of the geocentric position of mobile units, such as water and land vehicles, aircraft and survey equipment, to name a few.

In aircraft, GPS systems are being utilized for navigation, flight control, and air space control. These GPS systems may operate independently, or in combination with, among others, inertial reference systems or attitude heading reference systems in order to provide information during an aircraft flight mission.

Global positioning systems similar to NAVSTAR commonly use a GPS receiver, located on a mobile unit, for receiving satellite information signals transmitted from a plurality of satellites. Each GPS satellite transmits an information signal containing data that allows a user to determine the range or distance between selected GPS satellites and the antenna associated with the mobile unit's GPS receiver. These distances and knowledge of the satellite positions are then used to compute the position of the receiver unit using known triangulation techniques. For example, in the NAVSTAR-GPS system, a mobile unit with a GPS receiver, such as an aircraft, detects a pseudo random code contained in a given GPS satellite information signal and derives therefrom the "elapsed time" or time delay between the transmission of the satellite signal and its reception at the GPS receiver. From this time delay, the GPS receiver derives the range between the GPS receiver antenna and the satellite, sometimes referred to as the pseudo range or pseudo range measurement. Herein, the GPS receiver's position, or the mobile unit's position, generally refers to the corresponding antenna position.

In addition, as part of the NAVSTAR-GPS system, each satellite information signal also contains precise ephemeris data and course almanac data which both describe the corresponding satellite orbital trajectory in earth centered space as is well known in the art. The coordinates of the satellite's orbital position at the transmission time may be derived from either the ephemeris data or the course almanac data. The geocentric position of the satellite may be calculated with a higher degree of precision from the ephemeris data than is possible with the almanac data as is well-known It should be understood that the mobile unit's three-dimensional geocentric position coordinates are referenced to the World Geodetic Coordinate System. Herein, it should be recognized by those skilled in the art that the World Geodetic System is an earth-centered, earth-fixed geocentric coordinate system, which may be converted to any other coordinate system as required by the user. Sometimes the aforementioned coordinate system is referred to as the WGS84 earth-centered, earth-fixed, rectangular coordinate frame. Herein, the World Geodetic System Coordinates should be presumed, and position refers to this three dimensional WGS84 coordinate system.

In order to determine the position of the GPS receiver unit, a minimum of four satellite signals are required, rather than the expected three. This is so, since the GPS receiver includes a receiver clock which is not as accurate as the atomic clock of the satellites. Therefore, receiving satellite information signals from four different satellites provides a complete solution which permits the correction of any receiver clock error as is well understood in the art. Herein, the corrected receiver clock time is referred to as the receiver time. Thus, if signals from four or more satellites are available to the GPS receiver unit, the geocentric position of the receiver may be determined within approximately one-hundred meters of its "true" geocentric position. Herein, the receiver position derived by the triangulation technique using data from multiple satellites is referred to as the "estimated position". The accuracy of the estimated position of the receiver unit is dependent upon many factors including, among others, atmospheric conditions, selective availability, and the line of sight view of the satellites.

Although the satellite positioning system referred to as GPS is by far the most accurate global navigation system ever devised, its accuracy can be boosted using a technique called "differential GPS", sometimes referred to as "DGPS". DGPS can achieve measurement accuracy better than a meter. Differential GPS has been widely used in surveying applications, and now its use is being developed for aircraft approach and landing applications.

With regard to the latter, GPS systems standards have been developed by the RTCA Inc. (formerly called Radio Technical Commission for Aeronautics) in association with aeronautical organizations of the United States from both government and industry. The RTCA has defined performance requirements for a DGPS system as particularly identified in Document No. RTCA/DO-217, dated Aug. 27, 1993; and for GPS performance requirements for navigation equipment as particularly identified in Document No. RTCA/DO208, dated Aug. 27, 1993, both of which are incorporated herein by reference thereto.

As is well understood in the art, a differential GPS system incorporates a reference or "ground station" which includes a GPS receiver's antenna installed at a surveyed site. The geocentric position of the GPS receiver is known from surveying techniques. The GPS ground station receiver determines pseudo range values between the receiver and a plurality of satellites. Since the position of the satellite is derived from the satellite data associated with the satellite signals, and the position of the receiver is also known, a calculated range value therebetween may be determined for each of the tracked satellites. In turn, the difference between the measured pseudo range value and the calculated range value for each of the tracked satellites may be determined. This difference is commonly referred to as the "differential correction". The differential correction value is essentially the pseudo range error between the "observed" or "measured" pseudo range value derived from the satellite signal travel time and the calculated range value between the antenna's position and corresponding satellite position.

The motivation for differential operation is that many of the largest GPS error sources, such as selective availability and ionospheric effects, are common to two or more receivers operating in spatial and temporal proximity, since these anomalies affect the satellite signal travel time. These error sources can be nearly eliminated in the differential mode, by determining and applying the differential correction value or pseudo range error for greatly enhancing performance. A differential GPS system is shown and described in a publication entitled, "Design and Flight Test of a Differential GPS/Inertial Navigation System for Approach/Landing Guidance", Navigation: Journal of Institute of Navigation, Summer 1991, Vol. 38, No. 2, pp 103–122, incorporated herein by reference thereto.

As described therein, these differential corrections may be transmitted, by any data link technique, to a mobile unit which incorporates a GPS receiver and associated antenna experiencing substantially the same errors in the pseudo range observed values for the same tracked satellites as the ground station receiver. Accordingly, the mobile unit's pseudo range observed values may be corrected by the differential corrections for a more precise determination of the geocentric position of the mobile unit. It should be noted that the accuracy of the corrections is somewhat dependent on the proximity of the mobile unit relative to the ground station.

Although differential GPS ground stations have advanced the art of GPS for some applications, there is a need for a differential GPS ground station with enhanced integrity, continuity, and availability as particularly identified in the aforesaid RTCA publication.

SUMMARY OF THE INVENTION

An object of the present invention is to provide integrity information associated with a DGPS ground station which may be incorporated by an aircraft for a precision landing system.

In the present invention, a plurality of DGPS receivers are employed to determine receiver-satellite-specific differential correction values. In turn, satellite-specific differential correction values are determined as an average of the individual receiver-satellite-specific differential correction values for each of the tracked satellites. A discriminator is employed for determining a receiver-satellite-specific discriminant value which may be sampled to allow subsequent determination of a receiver-satellite-specific statistical value thereof. A discriminator value, computed as the differences between each receiver-satellite-specific differential correction and the average satellite-specific differential correction, is compared to a detection threshold. The detection threshold is set based on statistical values that have been determined using previously collected receiver-satellite-specific discriminant values. The receiver-satellite-specific statistical are also utilized for obtaining other integrity information associated with each of the satellite-specific differential correction values. The ground station further includes a means for communicating the satellite-specific differential correction values and integrity information associated therewith to a DGPS airborne receiver.

A DGPS airborne system in accordance with the present invention is configured to include a mechanization for receiving the satellite-specific differential correction values and integrity information associated therewith. An airborne integrity monitoring system may then be employed to derive particular integrity limit values associated with the DGPS derived position for pilot awareness as to whether or not the pilot should rely upon the DGPS solution for a precision landing.

DESCRIPTION OF THE PREFERRED EMBODIMENT

Figure 1A:
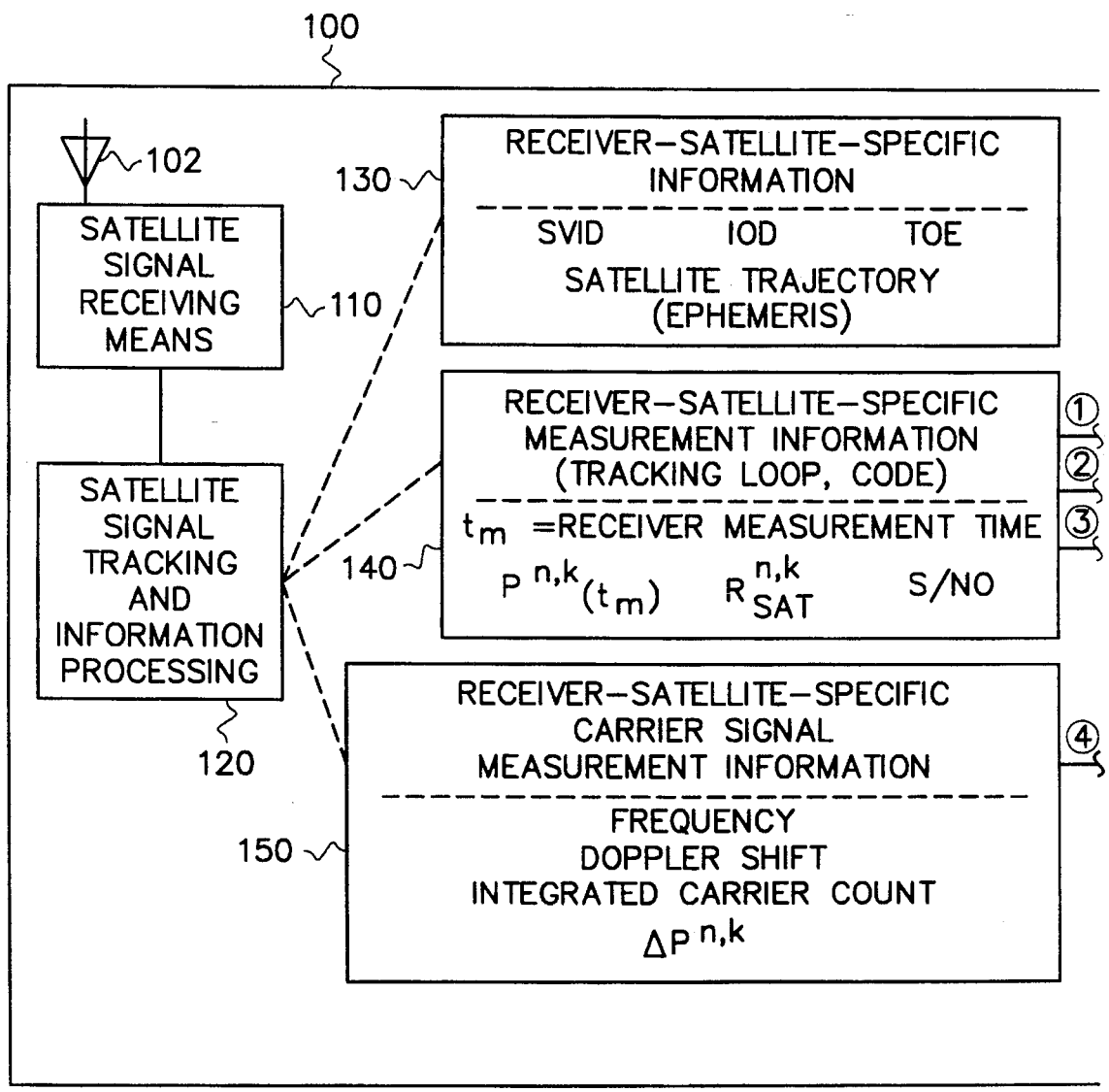
FIGS. 1A–1B is a block diagram illustrating a prior art GPS signal receiver.
Figure 1B:
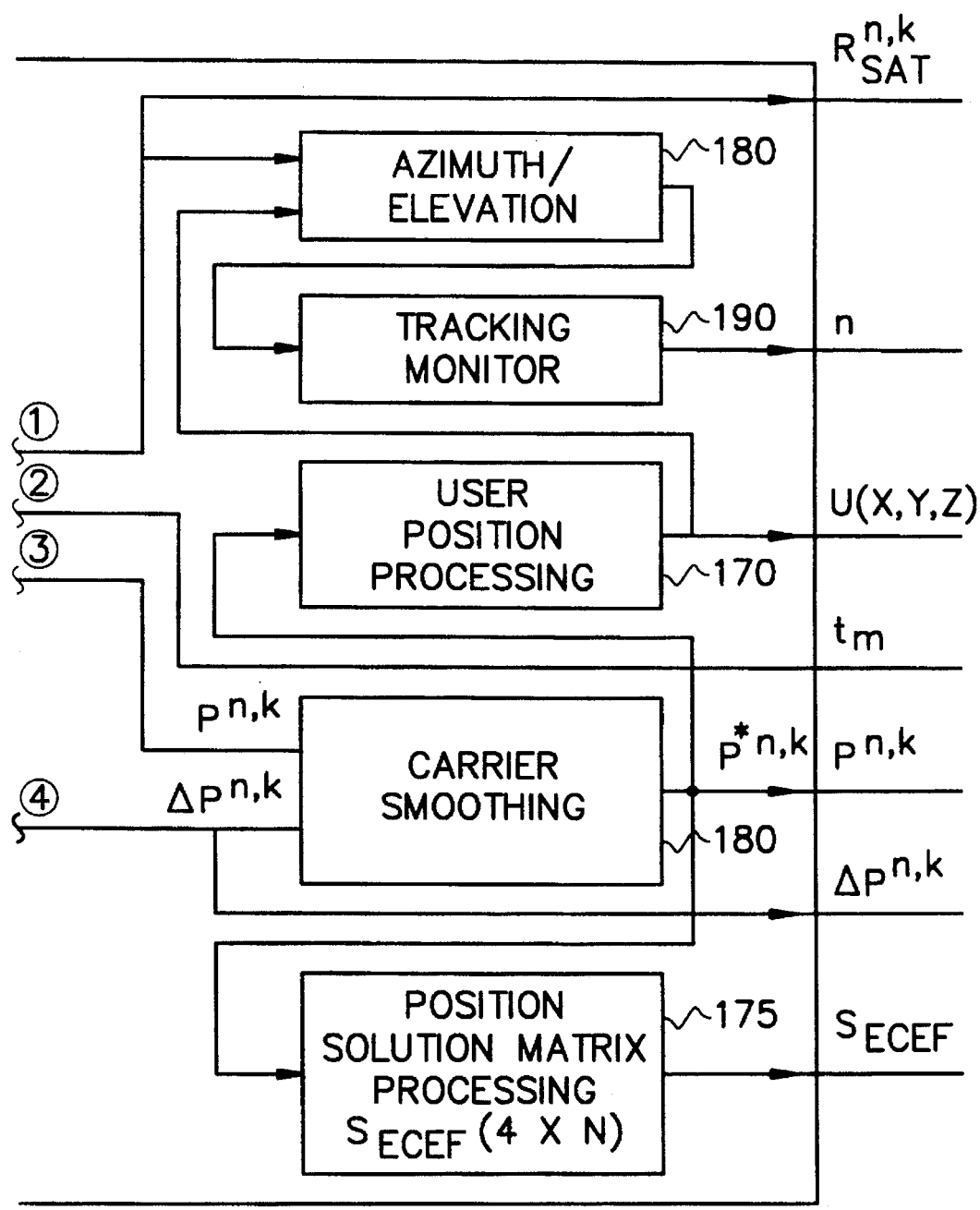

Illustrated in FIG. 1 is a prior art GPS signal receiver 100 having an associated receiving antenna 102. Herein, the acronym "GPS" generally refers to any satellite-based positioning system wherein each of a plurality of satellite vehicles employs a transmitter for transmitting a satellite information signal from which a user may determine the users position derived from a satellite information signal transmitted from at least four satellite vehicles. Such satellite-based positioning systems include at least those commonly referred to as "GPS" and "GLONASS".

The prior art GPS signal receiver 100, as well understood in the art of satellite positioning systems, is always coupled to a GPS receiving antenna, and serves to determine the actual position of the receiving antenna. Herein, the position of the antenna will be assumed even though phraseology may incorporate the use of the "position of the receiver" or "user position".

As illustrated in FIG. 1, the primary components of GPS signal receiver 100 are satellite signal receiving means 110 for receiving the transmitted satellite information signals, and satellite signal tracking and information processing means 120 which serves to decode all of the information contained in the satellite information signal in accordance with those standards specified by a particular satellite positioning system, for example, those specified by the U.S. Department of Defense with regard to the satellite positioning system commonly referred to as "GPS". More particularly, satellite signal tracking and information processing means 120 generally includes hardware/software for decoding (i) satellite-specific coded information associated with each transmitted satellite information signal received by signal receiving means 110, (ii) selected coded information (gold code) from which each satellite information signal transit time may be derived, and (iii) selected carrier signal parameters associated with each satellite information signal (e.g., frequency, phase, etc.) as received by satellite information signal receiving means 110. The aforesaid information is depicted in FIG. 1 by receiver-satellite-specific information block 130, receiver-satellite-specific measurement information block 140, receiver-satellite-specific carrier signal measurement information block 150, respectively.

Associated with block 130 is the common receiver-satellite-specific information, including, but not limited to Satellite Trajectory Data (commonly, the emphemeris data), and:

SVID=satellite vehicle identification number,

IOD=issue of data (satellite clock time at time of transmission of the information signal), and Toe=time of applicability.

Receiver-satellite-specific measurement information block 140 represents generally, the information derived from coded information coded onto the carrier signal of the satellite information signal, namely:

$t_m$=receiver-specific measurement time, $P^n$=pseudo range value, and

S/No=receiver signal to noise ratio $R_{sat}{}^n(t_m)$=satellite position at the receiver measurement time calculated from the satellite trajectory information.

Receiver-satellite-specific carrier signal measurement information block 150 is representative of the information derived from the carrier signal characteristics of each of the satellite information signals, and includes, among others:

f=satellite information signal frequency as observed by the receiver, $\phi$=phase measurements at the receiver, $\Delta P$=delta range value, Doppler-Shift=change in frequency of the carrier signal as observed by the receiver between two close points in time, and Integrated carrier count=count information which represents the phase change of the received satellite-specific information signal observed by the receiver between two close points in time.

Before proceeding, it should be understood that each measurement derived from the received or tracked satellite information signal is valid for a specific receiver measurement time. For multi-channel receivers, e.g. 12 channels, the GPS signal receiver may provide concurrent measurements, specifically receiver-satellite-specific pseudo range values and delta range values, and other information as aforesaid. However, for this data to be useful, all of this data must be related to the common receiver-specific measurement time "$t_m$". Different GPS signal receivers, even though they may be tracking the same satellite vehicles, may have a different receiver-specific measurement time primarily because of different internal clock times, noise factors, and possible multi-path effects. In the following exposition, and particularly the mathematical expressions which follow, it should be assumed that information derived from a particular satellite information signal by a particular receiver will have associated therewith an implied receiver-satellite-specific measurement time $t_m$ even though not expressed.

The GPS signal receiver 100 as briefly described above is commonly available and provided by such manufacturers as Honeywell Inc., Trimble, Novaltel, and Collins Radio, among others. GPS signal receiver 100 as described is generally embodied by sophisticated analog circuits and subsystems, digital networks, and computational devices including, among others, microprocessors, computers, and the like. As is well understood in the art, computational devices specifically embodied in the GPS signal receiver 100 may also be part of other subsystems for providing multiple or multiplexed tasks for other operations as is well known.

Further illustrated in FIG. 1 is a block diagram illustrating further functions commonly associated with the GPS signal receivers of the prior art. First, thereshown is carrier smoothing block 160 responsive to the pseudo range value $P^n$ and the delta range value $\alpha P$, thereby providing a "carrier smoothed" pseudo range value $P^{*n}$ as described in a publication entitled, "GPS Doppler Processing for Precision Positioning in the Dynamic Application", by Jarad Ashjaee, Nov. 1985, IEE Oceans Conference. It should be noted, however, that the function of carrier smoothing may be performed in other subsystems as described.

GPS signal receiver 100 may also include user-position processing identified by block 170 responsive to pseudo range values, or the carrier smoothed pseudo range values as illustrated in FIG. 1, from a plurality of satellites for determining the user's position U(x,y,z) by triangulation as is well understood in the art. In turn, position solution matrix processing may be incorporated as identified by block 175 to provide a position solution (least square) matrix $S_{ECEF}[4 \times N]$ which is used to obtain the user's position relative to all of the acquired satellite information signals, where the four dimensions represent the three axes of the coordinate reference frame and time, as is well-known.

The GPS signal receiver 100 may also include further refinements including an azimuth/elevation block 180 and tracking monitor 190. Azimuth/elevation block 180 may serve to first determine the azimuth/elevation angle of each of the tracked satellites relative to the user's position for subsequent determination as to whether or not the satellite information signals should be used, or not, based on minimum elevation angle selection criteria, commonly, 5°. Tracking monitor 190 may be included to provide an array of information indicating which of the satellites, by satellite vehicle identification number, "n", is considered to be an "acquired" satellite, or a "lost" satellite based on the azimuth/elevation angle selection criteria, signal reception, if any, or other criteria, as imposed by the user, generally embodied in software/firmware.

Again, referring to FIG. 1, GPS signal receiver 100 provides, as outputs, the receiver measurement time $t_m$, the satellite vehicle identification number, hereinafter referred to as simply "n", the satellite position $R_{SAT}{}^n(t_m)$, the pseudo range value $p^n$, which may be carrier smoothed as aforesaid, delta range $\Delta P$, as well as the GPS signal receiver (user) position U(x,y,z), and corresponding position solution matrix $S_{ECEF}$. These measurements may be further employed in a differential GPS system as will briefly described herein, and also described in a publication entitled Design and Flight Test of a differential GPS/Inertial Navigation System for Approach/Landing Guidance, Vallot et al., Journal of the Institute of Navigation, Vol. 38, No. 2, Summer 1991.

Figure 2:
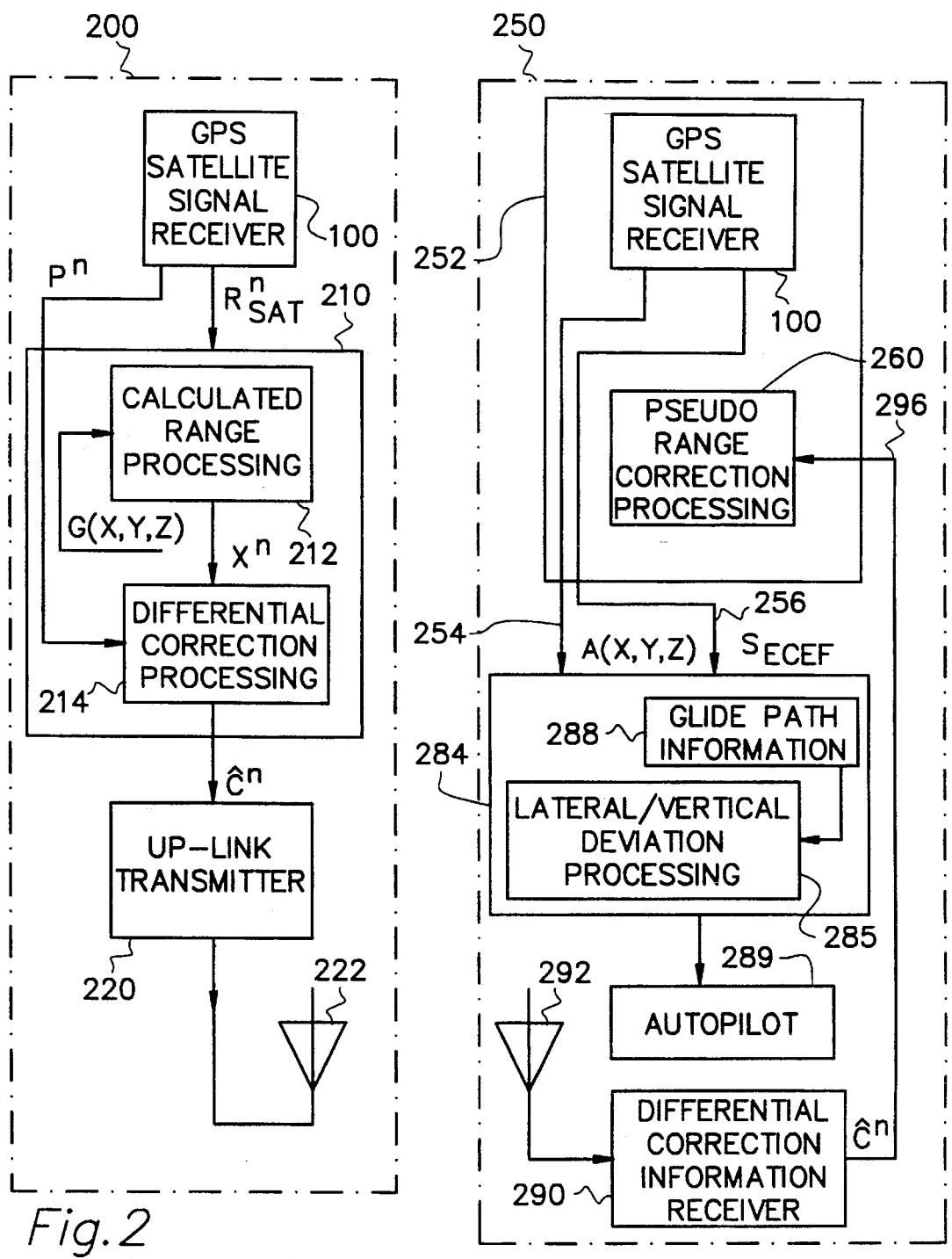
FIG. 2 is a block diagram illustrating a prior art ground station differential GPS system and an airborne differential GPS system.

The GPS signal receiver 100 briefly described above may be employed in a differential GPS (DGPS) aircraft landing system as particularly illustrated in FIG. 2. The system illustrated in FIG. 2 is similar to that as generally described in U.S. Pat. No. 4,894,655, entitled "Landing Assistance System Using Navigation Satellites", issued to Jognet et al., and U.S. Pat. No. 5,361,212, entitled "Differential GPS Landing System", issued to Class et al.

Referring to FIG. 2, thereshown is a DGPS ground station 200 and a DGPS airborne system 250, the latter being intended to be part of an aircraft flight control and/or navigation guidance system. Both DGPS ground station 200 and DGPS airborne system 250 each include a similar functioning GPS signal receiver 100, like that of FIG. 1, and are such that when the DGPS airborne system 250 is in proximity to the DGPS ground station 200, for example within 50 miles of the ground station, their respective GPS signal receivers 100 will generally track a common set of satellite vehicles, for example, $SV^1$, $SV^2$, ... $SV^n$. The superscript "n", herein, refers to specific tracked ones of the constellation of "N" satellite vehicles of a particular satellite positioning system.

DGPS ground station 200 further includes differential correction processing designated by block 210, an up-link transmitter 220, and transmitting antenna 222. Differential correction processing block 210 generally includes a calculated range processing block 212 for determining receiver-satellite-specific calculated range values $X^n$ as a function of the difference between the known surveyed position of GPS signal receiver 100 associated with ground station 200, represented by G(x,y,z), and each of the tracked satellite positions, provided by GPS signal receiver 100 and represented by $R_{SAT}^n$ as is well understood.

In turn, differential correction calculation block 214 is operative for determining a satellite-specific differential correction value $C_{wob}^n$, as a function of the satellite specific pseudo range value $P^n$ and the calculated range value $X^n$, and the estimated receiver-specific offset or clock bias (not shown) as is well known. These satellite specific correction values $C_{wob}^n$ are transmitted to the DGPS airborne system through up-link transmitter 220 and antenna 222.

As is well understood in the art, all GPS signal receiver measurement values have a receiver-satellite-specific measurement time, $t_m$ associated therewith. Further, it should be noted that the subscript "wob" implies that the GPS signal receiver clock bias has been taken into consideration. That is, the differential correction value has been adjusted for any error caused by clock bias. Hereafter, the satellite-specific differential correction values $C_{wob}^n$ will be represented by $\hat{C}^n$.

Again referring to FIG. 2, DGPS airborne system 250 is illustrated as generally including a DGPS signal receiver 252 and a flight guidance system 284 which includes lateral/vertical deviation processing block 285 and glide path information block 288. DGPS signal receiver 252 includes a GPS signal receiver 100, like that of ground station 200. DGPS signal receiver 252 further includes pseudo range correction processing indicated by block 260.

Airborne system 250 further includes differential correction information receiver 290 operative for receiving the satellite specific correction values $\hat{C}^n$, and in turn provide them as information to pseudo range correction processing block 260 as is indicated by data signal line 296.

DGPS signal receiver 252 is operative for providing the airborne user position A(x,y,z) and the position solution matrix $S_{ECEF}[4 \times N]$, indicated by outputs 254 and 256, respectively. This information is based on the measurement information provided by the airborne GPS signal receiver 100 corrected by the differential correction data $\hat{C}^n$, and may be generally derived by widely known Kalman filtering techniques as well as least square type algorithms, and the like.

Airborne flight guidance system 284 is intended to be responsive to the DGPS derived aircraft position A(x,y,z) and the position solution matrix $S_{ECEF}[4 \times N]$ provided as outputs of DGPS signal receiver 252 for providing an indication of any deviation between the aircraft position and an intended position, for example along a runway precision approach glide path. This is illustrated in FIG. 2 by lateral/vertical deviation processing block 285 intended to provide the appropriate lateral/vertical deviation error signals to an auto-pilot 289 so as to cause the aircraft to descend along a prescribed glide path provided by glide path information block 288. The glide path information 288 may be either stored in memory, or transmitted to the aircraft from the ground station as taught in the aforesaid patents, and also depicted in FIG. 3 by block 390 as will be further described.

Figure 3:
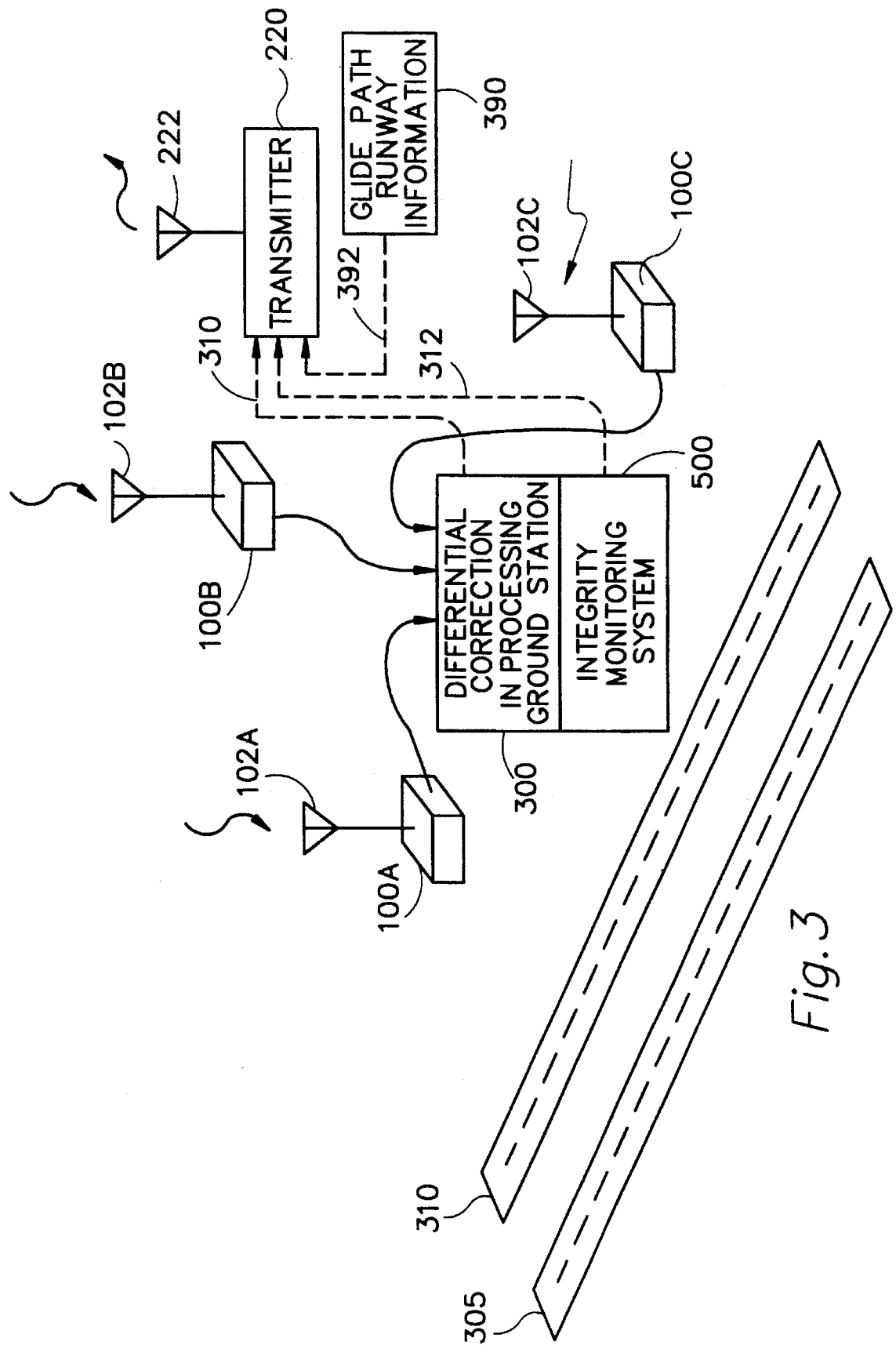
FIG. 3 is a schematic diagram illustrating a DGPS ground station system in accordance with the present invention in conjunction with an airport runway.

Illustrated in FIG. 3 is a schematic diagram illustrating a DGPS ground station in accordance with the present invention and intended for employment with an aircraft for a precision approach landing system at an airport. Thereshown are a pair of runways 305 and 310. In close proximity to the runways are three remote GPS signal receivers 100 identified as receivers 100A, 100B, and 100C, substantially similar to GPS signal receiver 100 of FIG. 1. GPS signal receivers 100A-C are intended to be spatially located such that their respective antennas are in spaced apart arrangement, being approximately 100 meters from each other, so as to separately receive GPS satellite information signals at substantially the same time.

The use of a plurality of GPS signal receivers for a ground station, in accordance with the present invention, is intended to insure that a strong multi-path signal affects only one of the GPS signal receivers. Secondly, if the plurality of GPS signal receivers for the ground station are properly spaced apart, the problem of the aircraft, itself, masking GPS satellite information signals from more than one of the plurality GPS signal receivers during the landing phase of the flight mission may be avoided, thereby diminishing the likelihood of a need to abort the landing due to loss of GPS acquired satellite information signals caused by a loss of a ground station GPS signal receiver redundancy check.

Further shown in FIG. 3 is a differential correction processing means 300, in accordance with the present invention, responsive to receiver-satellite-specific information from each of the remote GPS signal receivers 100A-C, for deriving satellite-specific differential correction information and corresponding integrity information, designated by numerals 310 and 312, which may be transmitted to an aircraft or mobile unit by up-link transmitter 220 and antenna 222, similar to that as shown in FIG. 2. Further details of the differential correction processing means 300 will be subsequently described with respect to FIG. 4.

Before proceeding, it is of paramount importance to understand that each of the GPS signal receivers 100A, 100B, and 100C, and corresponding antennae 102A, 102B, and 102C, respectively, operates totally independent for deriving "receiver-satellite-specific" information associated with as many tracked satellite vehicles as possible. In the exposition which follows, the term "receiver-satellite-specific" will be used to distinguish that the information is associated with only one of the GPS signal receiver and derived from one of the satellite information signals associated with a specific satellite vehicle. Similarly, the term "satellite-specific" will be used to identify information associated with a specific satellite. Accordingly, in the mathematical expressions which follow, it will be assumed that there are "N" satellites, and "K" receivers. Further, the mathematical terms may have a superscript pair, which designates a specific satellite "n", and specific receiver "k", (k=A,B,C, etc. or k=1,2,3) so as to obtain the desired receiver-satellite-specific information, or the satellite-specific information.

Figure 4:
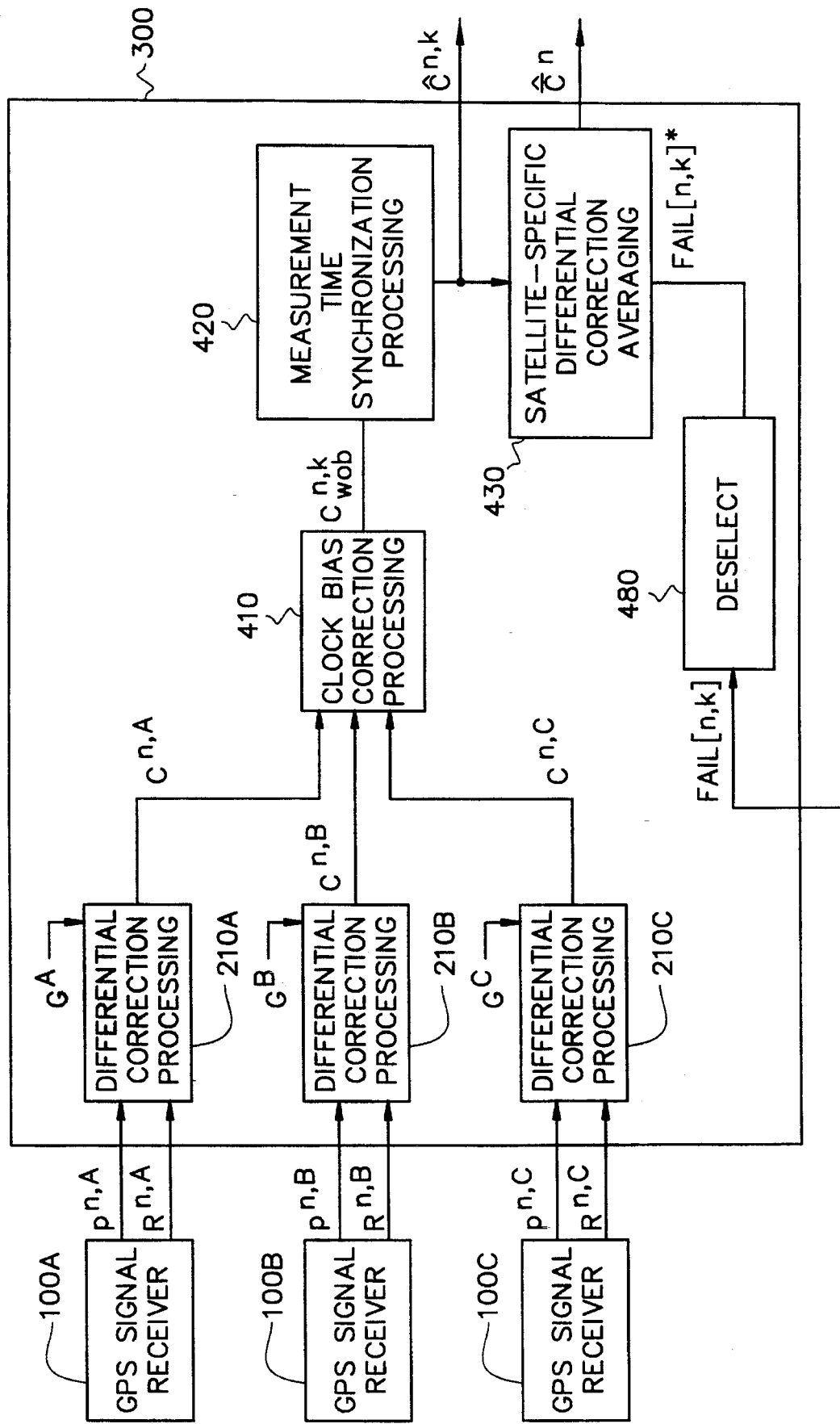
FIG. 4 is a block diagram illustrating the differential correction processing function of FIG. 3.

Illustrated in FIG. 4 is a block diagram illustrating the differential correction processing means 300 of FIG. 3 in accordance with the present invention. Thereshown is differential correction processing means 210A receiving inputs $G^A$, $p^{n,A}$ and $R_{SAT}^{n,A}$ from GPS signal receiver 100A, similar to differential correction processing means 210 and GPS signal receiver 100, respectively, as already described with reference to FIG. 2. Differential correction processing means 210A provides a raw differential correction output value indicated as $C^{n,A}$. It should be noted here that the measurement time, "$t_m$" (here, $t_m^A$), is always associated with a specific GPS signal receiver, 100A, 100B, and 100C, and $G^A$ is the known geocentric position of the corresponding GPS signal receiver 100A.

Further, differential correction processing means 300 includes differential correction processing means 210B and 210C, receiving inputs from GPS signal receivers 100B and 100C, respectively, also being substantially the same as differential correction processing means 210 and GPS signal receiver 100, respectively, as already described, and provides raw differential correction value outputs designated $C^{n,B}$ and $C^{n,C}$, respectively.

Again, it should be noted that GPS signal receivers 100A-C each independently derives measurement information as described earlier with reference to GPS signal receiver 100 illustrated in FIG. 1. In particular, each GPS signal receiver 100A-C may inherently have a clock time offset or bias with respect to the atomic clock time of the satellite vehicles. Secondly, since the GPS signal receivers are not necessarily tightly synchronized, the receiver-satellite-specific tracking information and the receiver-satellite-specific measurements may have differing measurement times "$t_m$".

Accordingly, differential correction processing means 300 includes clock bias correction processing means 410 and, optionally, measurement time synchronization processing means 420. Clock bias correction processing means 410 provides discrete differential correction values $C_{wob}^{n,k}$ which represents the raw differential correction value $C^{n,k}$ without clock bias. In turn, these output differential correction values are presented to measurement time synchronization processing means 420.

As indicated earlier, carrier smoothing may be alternately embodied in subsystems other than the GPS signal receivers 100. In the present invention, carrier smoothing is preferably embodied in block 300 such that the representation $p^{n,k}$ in FIG. 4 represents raw pseudo range and delta range measurements; and differential correction processing blocks 210A-C may incorporate the carrier smoothing function similar to that already described with reference to FIG. 1.

Measurement time synchronization processing means 420 is responsive to the output of the clock bias correction processing means 410, namely the receiver-satellite-specific correction values with clock bias removed, namely $C_{wob}^{n,k}$ so as to adjust these values to a common synchronization time $t_{sync}$. As illustrated in FIG. 4, the output of measurement time synchronization processing means 420 is designated $\hat{C}^{n,k}$ representing the receiver-satellite-specific differential correction values with clock bias removed and adjusted to reflect a common measurement time $t_{sync}$.

One example of measurement time synchronization processing means 420 is simply determining the median or average measurement time associated with each of the raw differential correction values $C_{wob}^{n,k}$, and adjusting the raw differential correction values $C_{wob}^{n,k}$ to the median or average time, and providing output differential correction values $\hat{C}^{n,k}$. This is desirable since associated with each value of $C_{wob}^{n,k}$ is potentially a significant differing receiver-satellite-specific measurement times, $t_m^k$ since the plurality of GPS signal receivers 100A-C are not necessarily tightly synchronized. On the other hand, if all GPS signal receivers are able to make measurements at the same measurement time, then the synchronization processing means 420 would no longer be necessary.

Similar to the system of FIG. 2, the purpose of differential correction processing means 300 is to provide satellite-specific differential correction information associated with all of the tracked satellites meeting the selected criteria as aforesaid, and in which the satellite-specific differential correction information is a function of receiver-satellite-specific information obtained by a plurality of GPS signal receivers.

Accordingly, differential correction processing 300, in accordance with the present invention, further includes a satellite-specific differential correction averaging processing means 430 for processing the receiver-satellite-specific correction values $\hat{C}^{n,k}$ so as to derive satellite specific differential correction average values represented by $\tilde{C}^n$, i.e., the average of the satellite-specific differential correction values observed by each of the three GPS signal receivers 100A-C. This may be accomplished by a simple average or a selected weighted average, or the like.

Before proceeding, it should be recognized by the reader that the configuration of differential correction processing means 300 illustrated in FIG. 4 may alternatively be arranged within the scope of the present invention. For example, each of GPS signal receivers 100A-C may include the differential correction processing function and clock bias removal function indicated by designated blocks 210A-C and block 420. That is, each of the GPS signal receivers may contain the necessary functions for obtaining the receiver-satellite-specific differential correction values $C_{wob}^{n,k}$, before any time synchronization, if necessary, and averaging performed by blocks 420 and 430, respectively, or other general functions as will be further described.

In accordance with the present invention, it is of paramount importance for a DGPS landing system, when employing DGPS as a primary control input for aircraft flight control, that the integrity of the DGPS derived position of the aircraft be within prescribed limits, more specifically, as described by the FAA, CAT-I requirements. Reference is hereby made to the following RTCA publications which describe requirements for GPS/DGPS systems: (i) Minimum Operational Performance Standards for Airborne Supplemental Navigation Equipment Using Global Positioning System (GPS), RTCA/DO-208 July 1991, Prepared by: Special Committee-159, and (ii) Minimum Aviation System Performance Standards DGNSS Instrument Approach System; Special Category I (SCAT-I), RTCA/DO-217 Aug. 27, 1993, Prepared by: Special Committee-159. Further GPS system requirements are set forth in a FAA document identified as: IFR Approval for Differential Global Positioning System (DGPS), Special Category I, and a technical Order, Instrument Approaches Using Private Ground Facilities Identified as Order No. 8400.11, Department of Transportation, Federal Aviation Administration, Sep. 15, 1994. These aforesaid documents are incorporated herein by reference.

Reference is also made to the The Institute of Navigation Proceedings of ION GPS-90, September 1990, and more particularly to a paper entitled, "Implementation of a RAIM Monitor in a GPS Receiver and an Integrated GPS/IRS", by Mats Brenner. The latter mentioned paper describes in detail a foundation of well accepted techniques for establishing integrity numbers related to aircraft position based on a GPS derived position solution. Portions of this paper forms a foundation of the prior art with regard to the term "integrity" as used herein.

In order to provide a precision DGPS landing system having the required integrity, the present invention incorporates ground station integrity monitoring providing two distinct integrity monitoring functions. The first is a discrete data integrity monitoring system intended for deselecting particular ground station receiver-satellite-specific information which is unacceptable, and would contaminate the resulting satellite-specific differential correction information $\tilde{C}^n$ obtained by the ground station's differential correction processing means 300. The second is ground station integrity information or peformance processing which establishes satellite-specific statistical integrity parameters related to the results associated with the satellite-specific differential correction information, which may in turn, be transmitted to a DGPS airborne landing system and utilized in combination with an airborne integrity monitoring system for subsequent determination of the integrity of the overall flight control and/or guidance DGPS derived drive signals.

The airborne integrity monitoring system in the preferred embodiment of the invention is intended to establish lateral and vertical integrity limit values which may be compared to selected "maximum" limit values. Based on these comparisons, a pilot or automatic control device may decide as to whether or not to rely upon a guidance signal derived by the DGPS position solution for controlling aircraft precision landing, and which ultimately may require a decision to abort the DGPS landing or use an alternative landing system or manual technique.

Illustrated in FIG. 3 is a ground station integrity monitoring system 500 associated with the differential correction processing means for providing integrity output information indicated by numeral 312 as an input to transmitter 220 intended for subsequent transmission to an aircraft. Details of ground station integrity monitoring system are particularly illustrated with reference to FIG. 5. As should be understood by those skilled in the art, the ground station integrity monitoring functions may be incorporated as a component part of differential correction processing means 300, however are described herein separately for ease of understanding the present invention.

Figure 5:
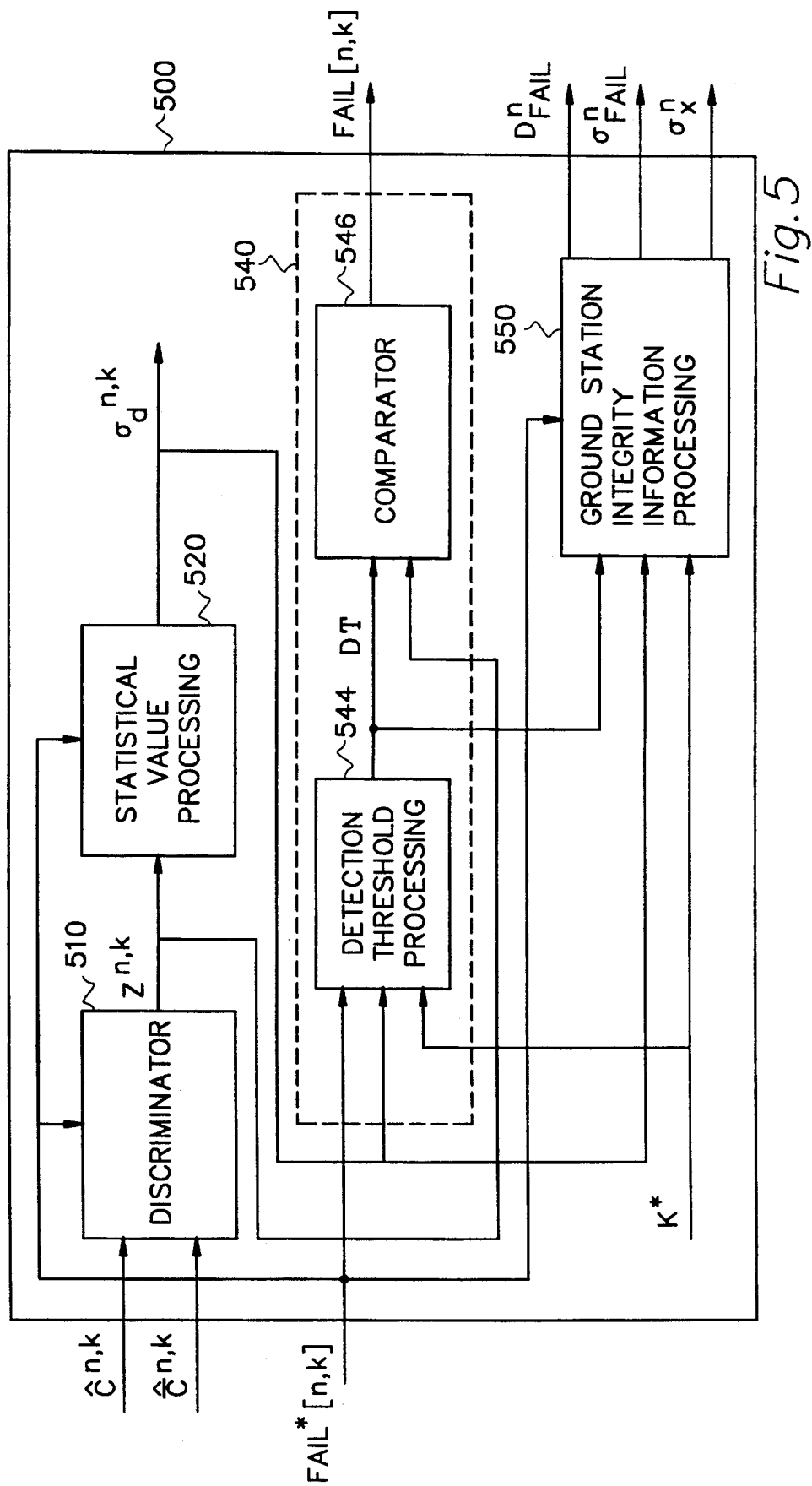
FIG. 5 is a functional block illustrating a ground station integrity monitoring system in accordance with the present invention.

Illustrated in FIG. 5 is a block diagram illustrating a ground station integrity monitoring system 500 in accordance with the present invention. Ground station integrity monitoring system 500 includes discriminator 510 which serves to provide receiver-satellite-specific discriminant values $Z^{n,k}$, and statistical value processing depicted by block 520 which serves to provide receiver-satellite-specific statistical discriminant values $\sigma_d^{n,k}$. Integrity monitoring system 500 further includes discrete data integrity monitoring system 540 which serves to provide a detection threshold value, DT, and a quantification of which receiver-satellite-specific discriminant value $Z^{n,k}$ exceeds the detection threshold value, DT, namely Fail [n,k]. It should be noted that DT could alternatively be a selected constant value, or a predetermined function such as a function of elevation/azimuth, etc., based on information compiled in block 520 over long time periods.

Integrity monitoring system 500 further includes ground station integrity information processing means 550 which establishes satellite-specific statistical integrity parameters associated with the resultant satellite-specific differential correction information for deriving integrity information associated with each of the satellite-specific differential correction average values $\bar{C}^{n,k}$ determined by the satellite-specific differential correction processing means 300.

As illustrated in FIG. 5, discriminator 510 receives as inputs (i) the outputs of the measurement time synchronization processing block 420, and (ii) the output of a differential correction averaging block 430, namely $\hat{C}^{n,k}$ and $\bar{C}^{n,k}$, respectively. In turn, the discriminator 510 serves to operate on the aforesaid input values for a determination of a discriminant value $Z^{n,k}$ which, in one embodiment of the invention, represents the difference between each of the receiver-satellite-specific correction values $\hat{C}^{n,k}$ and the differential correction average value $\bar{C}^{n,k}$.

Statistical value processing means 520, in the preferred embodiment of the invention, is operative for determining receiver-satellite-specific statistical values $\sigma_d^{n,k}$ associated with the corresponding behavior of the receiver-satellite-specific integrity discriminant values $Z^{n,k}$, representative of the statistical behavior of the integrity discriminant value $Z^{n,k}$ over a selected time interval, for example a 24-hour measurement period, or weeks of monitoring.

Statistical value processing means 520 may simply be a mathematical processor for determining the receiver-satellite-specific standard deviation of each of the receiver-satellite-specific integrity discriminant values $Z^{n,k}$ over the same time period. In turn, the statistical integrity discriminant value $\sigma_d^{n,k}$ may be employed by both the deselecting integrity system 540 and ground station integrity information processing means 550.

In one embodiment of the invention, discrete data integrity monitoring means 540 includes detection threshold processing means 544 and comparator 546. Detection threshold processing means 544 serves to calculate a detection threshold value DT based on (i) the output of $\sigma_d^{n,k}$ statistical value processing means 520, and (ii) prescribed probability limits, as will be described later, and mathematically expressed by:

$$DT^{n,k} = \sigma_d^{n,k} Q^{-1}\left(\frac{p_{fd}}{2}\right)$$

Comparator 546 is operative for comparing each of the integrity discriminant values $Z^{n,k}$ with the detection threshold DT and providing an output Fail [n,k] intended to be an identification of the particular satellite vehicle transmitting a satellite information signal received by a particular one of the ground station GPS signal receivers which yields a differential correction value beyond selected limits—i.e., failing the detection threshold test of the integrity discriminant value. In turn, the output Fail[n,k] of comparator 546 appropriately provides an input to deselection block 460 illustrated in FIG. 4.

Referring again to FIG. 5, ground station integrity information processing means 550 is shown responsive to the statistical integrity discriminant values $\sigma_d^{n,k}$ and an input K* indicative of the number of the remaining operative ones of the GPS signal receivers 100A, 100B, and 100C. In turn, ground station system integrity processing means 550 operates on the statistical integrity discriminant values $\sigma_d^{n,k}$ for determining satellite-specific integrity information associated with each of the satellite-specific differential correction average values $\bar{C}^{n,k}$. In one embodiment of the invention, ground specific integrity parameters: $D_{fail}$, $\sigma_{fail}$, and $\sigma_x$ which are intended to be station system integrity processor 550 is operative for providing three satellite utilized by an DGPS airborne flight control system as will be subsequently described.

As indicated above, the discrete data integrity monitoring system 540 is intended to provide an indication of which receiver-satellite-specific integrity discriminant values exceed the detection threshold value DT provided by detection threshold processor 544. Comparator 546 is intended to output a receiver-satellite-specific deselection matrix Fail[n,k], which in turn is provided as an input to deselection block 460 as illustrated in FIG. 4. Deselection block 460 then provides the receiver-satellite-specific deselection matrix Fail[n,k] as inputs to satellite-specific differential correction averaging means 430 for eliminating those specific receiver-satellite-specific correction values $\hat{C}^{n,k}$ which were found to result in failing the detection threshold test from being considered in the determination of the differential correction average value $\bar{C}^{n,k}$.

It should be noted that those correction values $\hat{C}^{n,k}$ which result in a failure to pass the detection threshold test at one moment—and one satellite constellation configuration, may be acceptable at other moments. However, deselection block 460 may also include software for keeping track of a pattern of behavior of any specific GPS signal receiver which results in differential correction failures which consistently are identified as failing the detection threshold, i.e., determining if particular GPS signal receivers and/or satellites have continuously produced resultant failures, i.e. Fail [n,k]. In turn, the failing one may be considered for elimination of use of any output therefrom, i.e., "permanently" deselecting such receivers and/or satellite differential correction information, indicate a request for service, and/or issue a notice of a DGPS ground station failure. This is so indicated by Fail*[n,k].

As illustrated in FIG. 5, the deselection matrix may also be provided as inputs to one or more of the blocks which comprise the integrity monitoring system 500. Use of deselecting those receiver-satellite measurements and corresponding data values may be advantageous for minimizing processing time as well as enhance the closed loop processing scheme. That iis, as illustrated in FIG. 5, the output of compartor 540, namely the deselection matrix, is dependent upon values which were determined based on presumed valid data. However, after a measurement fails, the average value of the differential correction is affected, and accordingly so is the detection threshold as well as the integrity parameters. Thus employment of the deselection matrix provides a very robust integrity monitoring system in accordance with the present invention.

It should be obvious to those skilled in the art that the three ground station GPS signal receivers provide a fail-safe, fail-operational system for determining the satellite-specific differential correction information. Whereas, if one of the GPS signal receivers should fail, fail-safe operation still would be available pending voter techniques for fail-safe, fail-operative operation, the details of which are beyond the scope of the present invention. However, a voter system is envisioned as part of a complete fail-safe, fail-operative system in practice of the present invention.

Figure 6:
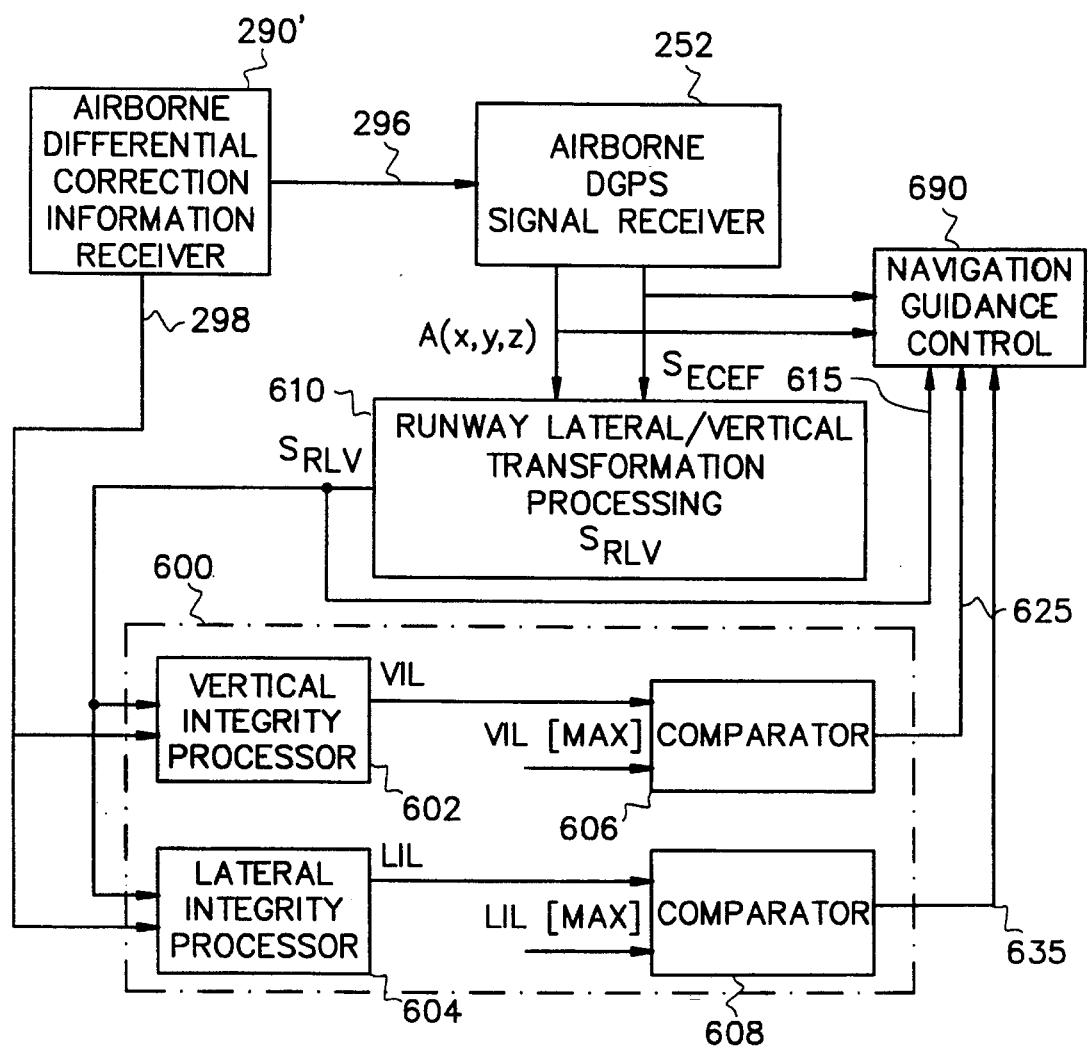
FIG. 6 is a block diagram illustrating an airborne DGPS signal receiver system in accordance with the present invention.

Illustrated in FIG. 6 is an DGPS airborne landing system, similar to that illustrated in FIG. 2, but which, in accordance with the present invention, incorporates differential correction information and associated integrity information therewith for providing a highly reliable DGPS landing system capable of meeting CAT-I flight control and landing system requirements. As illustrated in FIG. 6, the airborne DGPS landing system in accordance with the present invention incorporates DGPS receiver 252 which serves in substantially the same manner as that described with reference to FIG. 2. However, the DGPS airborne landing system in the present invention further includes an integrity monitoring system 600 and a runway lateral-vertical solution matrix transformation processing block 610 for matrix transformation from the usual position solution matrix $S_{ECEF}$ associated with the airborne DGPS signal receiver to a runway lateral/vertical position solution matrix $S_{RLV}$. Further, differential correction information receiver 290' is similar to differential correction receiver 290 illustrated in FIG. 2, but which includes (i) means for receiving the differential correction values $\hat{C}^n$ derived from the plurality of GPS signal receivers 100A-C indicated by output data flow line 296 and (ii) means for receiving integrity information associated with each of the specific correction values $\hat{C}^n$ indicated by output line 298.

Integrity processor 600 includes software which serves as a vertical integrity processor 602 and lateral integrity processor. Vertical integrity processor 602 is intended to calculate a vertical integrity limit value, VIL, associated with the vertical deviation between (i) the aircraft position derived from the DGPS solution using the differential correction information transmitted from the ground station, and (ii) a designated glide path. Lateral integrity block 602 is intended to calculate a lateral integrity limit value, LIL, associated with the lateral deviation between (i) the aircraft position derived from the DGPS solution using the differential correction information transmitted from the ground station, and (ii) a designated glide path. The vertical integrity value is intended to indicate the degree of trust of the vertical deviation with a selected probability of being valid, and a lateral integrity value is intended to indicate the degree of trust of the lateral deviation with a selected probability of being valid. These probabilities range from $[1-10^6]$ to $[1-10^9]$.

Airborne DGPS signal receiver 252, illustrated in FIG. 6, like that illustrated in FIG. 2, includes pseudo range correction processing (not shown) responsive to the differential correction values as outputs on data line 296 from airborne differential correction information receiver 290'. In turn, as before, airborne DGPS signal receiver 252 includes a means for determining the aircraft position A(x,y,z) and position solution matrix $S_{ECEF}$, indicated by numerals 654 and 655, respectively.

Runway lateral-vertical transformation processing means 610 is intended to provide the following transformation from $S_{ECEF}$ to $S_{RLV}$ having the form:

$$S_{RLV} = \begin{bmatrix} s_{r1} \ldots s_{rn} \\ s_{l1} \ldots s_{ln} \\ s_{v1} \ldots s_{vn} \\ s_{t1} \ldots s_{tn} \end{bmatrix}$$

where r, l, v, and t represent runway, lateral, vertical, and time, respectively. This transformation is commonly known in the art and is the basis for describing the lateral and vertical deviation between the DGPS derived position of the aircraft and the designated glide path.

Airborne integrity processing means 600 further includes a comparator 606 for comparing the vertical integrity limit value output VIL of the vertical integrity processing means 602 with a predetermined maximum vertical integrity limit value identified as VIL[MAX]. Similarly, comparator 608 compares the lateral integrity value output LIL of the lateral integrity processing means 604 with a predetermined maximum lateral integrity limit value identified as LIL[MAX]. In turn, these comparators 606 and 608 may provide alarm indicators 625 and 635, respectively. These alarm indicators may be used to audibly or visually alert a pilot, or alert other flight management subsystems (for example, navigation guidance control block 690) for forcibly determining recognition that the differential correction values and the integrity associated therewith are beyond specified limits for executing a DGPS driven landing.

In the embodiment of the invention, IOD changes must be handled correctly to assure that the detection thresholds are not triggered by such events. This can be done by letting GPS signal receiver 100 provides double sets of satellite positions and the difference in the satellite differential corrections using ephemeris data at old and new times.

When all receivers (block 100) have received the new ephemeris, a timer is set to initiate the switch to the new ephemeris instantaneously in all K receivers. The timer is set long enough to assure that the airborne user's GPS signal receivers have the new ephemeris available. Utilization of this technique assures that the monitoring scheme described above is realizable.

The following mathematical analysis is intended to provide the reader a further understanding of the integrity monitoring system 500 in accordance with the present invention.

First, it should be noted that each receiver-satellite-specific differential correction may contain a noise value $^u w^{n,k}$, where k represents the specific receiver. Then:

$$\hat{C}^{n,k} = \hat{C}^{n,k}\{true\} + w^{n,k}$$

where k=1 through K total receivers, except for the differential correction of a malfunctioning receiver "m" with an offset $\epsilon$ described by:

$$\hat{C}^{n,m} = \hat{C}^{n,m}\{true\} + W^{n,m} + \epsilon$$

In order to detect a malfunctioning receiver result, the average value of all of the satellite-specific differential correction values for all receivers is first established by satellite-specific differential correction average processing means 430. The satellite-specific differential correction average may be mathematically expressed by:

$$\tilde{\hat{C}}^n = \frac{1}{K} \sum_{k=1}^{K} \hat{C}^{n,k}$$

where $\hat{C}^{n,k}$ is the receiver-satellite-specific differential correction value at the common synchronization time, namely the output of measurement time synchronization processing block 420.

A discriminant may be chosen as a function of the satellite-specific differential correction average value as follows:

$$Z^{n,k} = \hat{C}^{n,k} - \tilde{\hat{C}}^{n,k}$$

for each of the K receivers and N satellite vehicles.

In order to meet FAA requirements, it is mandatory or assumed that the discriminant be less than a detection threshold value DT which is determined as a function of a selected false detection rate $p_{fd}$ as follows:

$$p_{fd} = 2Q\left(\frac{D}{\sigma_d}\right) = \frac{2}{\sqrt{2\pi}} \int_{D/\sigma_d}^{\infty} e^{-\frac{t^2}{2}} dt$$

Defining $Q^{-1}$ as the inverse of Q then:

$$D = \sigma_d Q^{-1}\left(\frac{p_{fd}}{2}\right),$$

for example if the chosen false detection rate of $10^{-5}/$ sample, then $$p_{fd} = 10^{-5} \Rightarrow DT = 4.4\sigma_d$$

where $\sigma_d$ represents the 1-sigma standard deviation of the discriminant $Z^{n,k}$, which is determined by statistical integrity discriminant value processing block 520. One simple implementation for statistical integrity discriminant value processor 520 is collecting receiver-satellite-specific discriminant values $Z^{n,k}$, the output of integrity discriminant value processor 540, at a selected sample rate and over a selected time interval, and subsequently determining the 1-sigma standard deviation of the samples. In essence, each of these receiver-satellite-specific 1-sigma values is thereby related to acquisition of the corresponding satellite information signal transmitted from the same satellite vehicle (n) by the same GPS signal receiver system (k) for a sufficient time to assess the quality of the specific receiver with respect to a specific satellite information signal.

Detection and identification of a malfunctioning receiver-satellite combination is determined by comparator 546 whenever:

$$|Z^{n,k}| > DT^{n,k}$$

and comparator provides the indication of those combinations which produce results which fail the comparison, as identified by Fail[n,k].

It should be noted that associated with each of the discriminant values $Z^{n,k}$ is noise. Noise in the integrity discriminant value $Z^{n,k}$ associated with a malfunctioning receiver "m" may be described as a function of the noise in each differential correction value associated with a particular receiver by:

$$w_d^m = \frac{K-1}{K} w^m - \frac{1}{K} \sum_{k \neq m}^{K} w^k$$

From the above expression, it follows that the square of the 1-sigma discriminant standard deviation may be related to the square of the 1-sigma variation in the receiver noise as follows:

$$(\sigma_d^{n,m})^2 \equiv \left(\frac{K-1}{K}\right)^2 (\sigma_m^{n,m})^2 + \left(\frac{1}{K}\right)^2 \sum_{k \neq m}^{N} (\sigma n_w^{n,k})^2 = \frac{K-1}{K} (\sigma_w^{n,k})^2$$

The standard deviation of the noise as mathematically described above is very useful for determining satellite-specific parameters descriptive of the accuracy of each of the satellite differential correction values determined by the ground station in accordance with the present invention, more specifically, the satellite-specific differential correction average values $\tilde{\hat{C}}^n$.

One such parameter is commonly referred to as the UDRE (User Differential Rate Error@99.5% performance) which describes accuracy under fail free conditions by the following exemplary mathematical relationship:

$$UDRE^{n,k} = 3.0 \frac{1}{\sqrt{K}} \sigma_w^{n,k} = 3.0 \frac{1}{\sqrt{K-1}} \sigma_d^{n,k}, \text{ and}$$

$$\sigma_w^{n,k} = \sqrt{\frac{K}{K-1}} \sigma_d^{n,k}$$

where $\sigma_d^{n,k}$ is the 1-sigma standard deviation discriminant value evaluated for the satellite specific value of $Z^{n,k}$ for all K receivers and for all N satellites where the observations are desirably taken over at least 24 hours of operation.

An enhanced approach in accordance with the present invention is the determination of the receiver-satellite-specific 1-sigma values $\sigma_d^{n,k}$ profiled for satellite elevation and azimuth angles. In other words, a table of "receiver-specific look-up table" may be established for all of the satellites based on their elevation and azimuth angles relative to the GPS signal receiver (being substantially the same for those in close proximity to the runway). The look-up table may be determined by a variety of techniques—for example, sampling the discriminant values as before, but also identifying the elevation and azimuth angles at the time of the sample. This approach enhances the validity of the ground station satellite-specific differential correction integrity information more fully described below.

Therefore, in the exposition which follows, the value for $\sigma_d^{n,k}$ may be assumed to be either the usual receiversatellite-specific standard deviation value, or alternatively that which is evaluated particularly for satellite-specific elevation/azimuth position.

As indicated earlier, an airborne flight control system requires a DGPS aircraft position to be highly accurate with several integrity requirements. More particularly, any errors in the lateral and vertical deviation between the aircraft position and a prescribed flight path is of paramount importance for success of DGPS driven precision landings. The following mathematical description sets forth ground station integrity parameters in accordance with the present invention, and is intended for employment in an airborne DGPS integrity monitoring system. The airborne integrity monitoring system is intended to provide a pilot an indication when the overall integrity of the DGPS ground station is sufficient to rely upon a DGPS driven landing which meets those requirements for CAT-I landing as required by the FAA.

It should be noted that at detection the following holds true:

$$\pm DT^{n,m} = Z^{n,m} = \frac{K-1}{K}(\epsilon + w^{n,m}) - \frac{1}{K}\sum_{k \neq m}^{K} w^{n,k}$$

which may be rearranged as follows:

$$(\epsilon + w^{n,m}) = \frac{K}{K-1}(\pm DT^{n,m}) + \frac{1}{K-1}\sum_{k \neq m}^{K} w^{n,k}$$

which represents the noise and error in a malfunctioning receiver "m" as a function of the detection threshold value DT and the noise in non-malfunctioning receivers.

Since the integrity of the system is dependent on the differential correction average value $\bar{C}$, it is important to evaluate the worst case error in this value as mathematically described by:

$$m_c = \frac{1}{K-1}(\pm DT) + \frac{1}{K-1}\sum_{k \neq m}^{K} w^{n,k} = \frac{1}{K-1}(\pm DT) + w_{fail}$$

where K is the number of operative ground station GPS signal receivers, and $w_{fail}$ is the noise in each averaged differential correction value under a failure condition mathematically expressed by:

$$\sigma_{fail}^n = \sqrt{\frac{1}{(K-1)^2}\sum_{k \neq m}^{K}(\sigma_w^{n,k})^2}$$

Assuming a normal distribution function in non-malfunctioning satellites, the worst case noise in the satellite-specific differential correction average value $\bar{C}$ may also be mathematically expressed as a function of the noise in each satellite measurement $\sigma_w^{n,k}$.

$$\sigma_x^{n,m} = \sqrt{\frac{1}{K^2}\sum_{k=1}^{K}(\sigma_w^{n,k})^2}$$

Finally a weighted value of the detection threshold is chosen to be:

$$D_{fail}^n = \frac{1}{K-1}DT^n$$

In one embodiment of the present invention, the ground station differential correction integrity information processing 550 is configured to provide as outputs:

$D_{fail}^n$, $\sigma_{fail}^n$, and $\sigma_x^n$.

Now considering an airborne DGPS flight control system, it should be understood that a DGPS driven flight control system makes use of the position solution matrix $S_{ECEF}$ output (related to the line of sight measurement matrix, sometimes referred to as the H matrix) provided by the DGPS signal receiver 252, but which is transformed into a position solution matrix expressed in terms of a "runway-lateral-vertical coordinate reference frame", identified as $S_{RLV}$. This latter matrix, is identified by numeral 611, the output of block 610 in FIG. 6. The matrix elements have following form:

$$S_{RLV} = \begin{bmatrix} s_{r1} \ldots s_{rn} \\ s_{l1} \ldots s_{ln} \\ s_{v1} \ldots s_{vn} \\ s_{t1} \ldots s_{tn} \end{bmatrix}$$

where $S_{RLV}$ represents the least squares position solution matrix in the runway-lateral-vertical coordinate reference frame by application of a transformation of the position solution matrix $S_{ECEF}$. It should be noted that the position solution matrix is in the form of 4×N matrix, where one of the rows, identified as row "L" represent the lateral coefficients, and another row identified as row "V" represent the vertical coefficients, the other two rows being associated with runway direction, and time.

Referring again to FIG. 6, it is the purpose of vertical integrity processor 602 to evaluate the vertical integrity limit value for the "j th" satellite as mathematically described by:

$$VIL^j = s_V^j DT_{fail}^j + \sigma_V^j Q^{-1}(p_{md})$$

where $$(\sigma_V^j)^2 = \sum_{n \neq j}^{N}(s_V^n)^2[(\sigma_x^n)^2 + (\sigma_{ab}^n)^2] + (s_V^j)^2[(\sigma_{fail}^j)^2 + (\sigma_{ab}^j)^2] + (\sigma_{FTE\_V})^2$$

where the value $\sigma_{FTE\_V}$ represents the 1-sigma standard deviation of the "Flight Technical Error" in the vertical direction. This value is, of course, weather and airplane dependent, and typically is an empirically determined value. This assumes the $\sigma_x^{n,k}$ is the same for all receivers, namely $\sigma_x^n$.

Alternatively, an actual FTE_V value may be observed in real time by empirical measurements as opposed to the 1-sigma value. In this case, the FTE_V value would be eliminated from the just recited expression and added to the preceding expression for $VIL^j$.

Similarly, lateral integrity processor 604 is intended to evaluate the lateral integrity limit value for the j th satellite as mathematically described by:

$$LIL^j = s_L^j D_{fail}^j + \sigma_L^j Q^{-1}(p_{md})$$

where, $$(\sigma_L^j)^2 = \sum_{n \neq j}^{N}(s_L^n)^2[(\sigma_x^n)^2 + (\sigma_{ab}^n)^2] + (s_L^j)^2[(\sigma_{fail}^j)^2 + (\sigma_{ab}^j)^2] + (\sigma_{FTE\_L})^2$$

where the value $\sigma_{FTE\_L}$ represents the 1-sigma standard deviation of the Flight Technical Error in the lateral direction. It too may alternatively be eliminated from the just recited expression, and the observed value FTE_L added to the preceding expression for $LIL^j$.

Although not mathematically expressed herein, it should be recognized that the integrity of the resultant runway direction or heading (RIL) may be calculated as well in a similar manner and it's impact related to the VIL and the desired glide path angle.

In one embodiment of the invention, vertical integrity processor 602 is operative for providing as an output the vertical integrity limit value (VIL) maximum of any of the tracked satellite at the current landing system sample time. In turn, this value may be compared with a selected maximum VIL[MAX] by comparator 606. Similarly, lateral integrity processor 604 is operative for providing as an output the lateral integrity limit value (LIL) maximum of any of the tracked satellite at the current landing system sample time. In turn, this value may be compared with a selected maximum LIL[MAX] by comparator 608. In turn, whenever either comparators 606 or 608 detects that either the venial or lateral integrity values exceeded their respective maximum threshold value, comparators 606 and 608 output a selected alarm signal for subsequent system process to notify flight management systems or the pilot directly of the alarm situation in order for corrective action to be taken.

It should be recognized that the schematic block diagrams particularly illustrated in the accompanying Figures may be configured by employment of many electronic subsystems, computers, and software/firmware implementations, all of which are intended to be within the true spirit and scope of the present invention. In particular the processing means and or designated blocks are intended to perform the indicated functions and/or calculations.

With reference to FIG. 3, it should be noted that differential correction processing means 300 is illustrated as receiving as inputs the measurement information from the plurality of GPS receivers 100A-C. However, it is within the scope of the present invention that the differential correction processing means 210 may be incorporated as part of the GPS receiver, itself. In this situation, the differential correction processing means 300 would perform the remaining functions as illustrated in FIG. 4 except for the raw differential correction. It should be understood by those skilled in the art the location of the processing function is a matter of design choice, all of which are intended to be within the scope of the present invention.

Similarly, ground station integrity information processing means 550 may alternatively be on the DGPS airborne system illustrated in FIG. 6. In this situation, the ground station is operative to transmit the information necessary to obtain the needed satellite-specific integrity information. For example, only the satellite-specific statistical values and the number of operative receivers is what is required to obtain the necessary integrity information as indicated by the above mathematical analysis.

Selected discriminant and algorithms have been described herein for obtaining integrity information associated with the satellite-specific differential correction values. Others, of course, may be applied without departing from the true spirit and scope of the present invention, namely, the method of obtaining integrity information for a landing system where integrity information is associated with a satellite-specific differential correction value derived by averaging the satellite-specific differential correction value determined by a plurality of DGPS receivers.

Lastly, particular vertical and lateral integrity limit values have been shown with regard to a particular runway later vertical transformation matrix. However, other such transformations and coordinate systems are intended to be within the true spirit and scope of the present invention.

The embodiments of an invention in which an exclusive property or right is claimed are defined as follows:

1. A differential satellite positioning system ground station for determining GPS differential correction information with integrity monitoring, said differential satellite positioning system ground station comprising:

a plurality of GPS signal receivers, each at a known geocentric position, each operative for receiving a satellite-specific information signal transmitted from each of selected ones of a plurality of satellite vehicles, and each operative for deriving, from each of said received satellite-specific information signals from said satellite vehicles, receiver-satellite-specific GPS signal information;

first differential correction processing means for deriving receiver-satellite-specific GPS differential correction information associated with each of said satellite-specific information signals, where said receiver-satellite specific differential correction information is a function of said receiver-satellite-specific GPS signal information determined by a specific one of said GPS signal receivers and said known position of said GPS signal receivers for the same one of said GPS signal receivers;

second differential correction processing means operative for determining satellite-specific GPS differential correction information, associated with each of said satellite-specific information signals, as a function of said receiver-satellite-specific GPS differential correction information determined by more than one of said plurality of GPS signal receivers and associated with the same one of said satellite-specific information signals;

ground station integrity monitoring means for determining satellite-specific integrity information associated with each of said satellite-specific information signals, as a function of said receiver-satellite-specific GPS differential correction information and said satellite-specific GPS differential correction information, where said satellite-specific integrity information is descriptive of the integrity of said satellite-specific GPS differential correction information.

2. The differential satellite positioning system ground station of claim 1 wherein:

said first differential correction processing means is operative for determining a receiver-satellite-specific GPS differential correction value, associated with each of said satellite-specific information signals and each of said plurality GPS signal receivers, as a function of said receiver-satellite-specific GPS signal information, and said known position of the corresponding one of said plurality of GPS signal receivers;

said second differential correction processing means includes means for providing a satellite-specific statistical GPS differential correction value, associated with each of said received satellite-specific information signals, as an average of said receiver-satellite-specific differential correction values associated with the same satellite information signal and derived from said receiver-satellite-specific GPS signal information from more than one of said plurality of GPS signal receivers; and said ground station integrity monitoring means includes, discriminator means operative for determining, for each of said receiver-satellite-specific GPS differential correction values, a receiver-satellite-specific integrity discriminant value as a selected function of corresponding ones of said satellite-specific statistical GPS differential correction values and said receiver-satellite-specific differential correction values associated with the same satellite-specific information signal and corresponding one of said plurality of GPS signal receivers, a statistical value processing means operative for determining a receiver-satellite-specific statistical value associated with each of said receiver-satellite-specific integrity discriminant values, as a function of corresponding ones of said receiver-satellite-specific integrity discriminant values, and which is descriptive of the behavior of said receiver-satellite-specific integrity discriminant values sampled over a selected time period.

3. The differential satellite positioning system ground station of claim 2 wherein said ground station integrity monitoring means determines said satellite-specific integrity information as a function of said receiver-satellite-specific statistical integrity discriminant values associated with more than one of said plurality of GPS signal receivers and associated with the same one of said satellite-specific information signals.

4. The differential satellite positioning system ground station of claim 2 wherein said integrity monitoring means further includes deselecting means for identifying those of said receiver-satellite-specific integrity discriminant values which exceed a selected detection threshold.

5. The differential satellite positioning system ground station of claim 4 wherein said deselecting monitoring means includes:

means for determining a detection threshold value as a function of said receiver-satellite-specific statistical integrity discriminate values; and comparator means for comparing each of said integrity discriminate values with said detection threshold value, and providing an identification of which receive-satellite-specific ones of said receiver-satellite-specific discriminant values exceeds said detection threshold value.

6. The differential satellite positioning system ground station of claim 1 further comprising means for communicating said satellite-specific differential correction information and corresponding satellite-specific integrity information to a remote differential satellite positioning system user.

7. The differential satellite positioning system ground station of claim 1 wherein said differential correction processing means includes means for determining said receiver-satellite-specific differential correction values synchronized to a common measurement time and with receiver-specific clock bias removed.

8. The differential satellite positioning system ground station of claim 5 wherein each of said satellite-specific differential correction values is a function of said receiver-satellite-specific differential correction values excluding those receiver-satellite-specific ones having corresponding receiver-satellite-specific discriminant values which were identified by said comparator means.

9. A differential satellite positioning system comprising:

ground station for determining GPS differential correction information, with integrity monitoring including, a plurality of GPS signal receivers, each at a known geocentric position, each operative for receiving a satellite-specific information signal transmitted from each of selected ones of a plurality of satellite vehicles, and each operative for deriving, from each of said received satellite-specific information signals from said satellite vehicles, receiver-satellite-specific GPS signal information;

first differential correction processing means for deriving receiver-satellite-specific GPS differential correction information associated with each of said satellite-specific information signals, where said receiver-satellite specific differential correction information is a function of said receiver-satellite-specific GPS signal information determined by a specific one of said GPS signal receivers and said known position of said GPS signal receivers for the same one of said GPS signal receivers;

second differential correction processing means operative for determining satellite-specific GPS differential correction information, associated with each of said satellite-specific information signals, as a function of said receiver-satellite-specific GPS differential correction information determined by more than one of said plurality of GPS signal receivers and associated with the same one of said satellite-specific information signals;

ground station integrity monitoring means for determining satellite-specific integrity information associated with each of said satellite-specific information signals, as a function of said receiver-satellite-specific GPS differential correction information and said satellite-specific GPS differential correction information, where said satellite-specific integrity information is descriptive of the integrity of said satellite-specific GPS differential correction information means for transmitting said satellite-specific differential correction information and said satellite-specific integrity information to a remote differential satellite positioning system; and a remote differential satellite positioning system including, means for receiving said satellite-specific differential correction information and said satellite-specific integrity information, GPS signal receiver operative for (i) receiving a satellite-specific information signal transmitted from each of selected ones of a plurality of satellite vehicles, and operative for deriving from each of said satellite-specific information signals from said satellite vehicles user-satellite-specific GPS signal information,(ii) deriving the user-position of said remote GPS signal receiver as a function of said user-satellite-specific GPS signal information corrected by said satellite-specific GPS differential correction information, and (iii) determining a position solution matrix representative of the line of sight vectors between the derived user-position and each of said satellite vehicles, and integrity monitoring means for determining the integrity of said user position as a function of said position solution matrix and said satellite-specific integrity information.

10. A differential satellite positioning system ground station for determining satellite-specific GPS differential correction information with corresponding satellite-specific integrity information, said differential satellite positioning system ground station comprising:

a plurality of GPS signal receivers, each at a known geocentric position, each operative for receiving a satellite-specific information signal transmitted from each of selected ones of a plurality of satellite vehicles, and each operative for deriving, from each of said received satellite-specific information signals from said satellite vehicles, receiver-satellite-specific GPS signal information;

differential correction processing means for separately deriving a receiver-satellite-specific GPS differential correction value for each GPS signal receiver, and associated with each of said satellite-specific information signals, as a function of said receiver-satellite-specific GPS signal information determined by each of said plurality of GPS signal receivers;

means for determining a satellite-specific GPS differential correction value, associated with each of said satellite-specific information signals, as an averaging function of said receiver-satellite-specific GPS differential correction values determined by more than one of said plurality of GPS signal receivers and associated with the same one of said satellite-specific information signals;

discriminator means for determining a receiver-satellite-specific discriminant value associated with each satellite-specific information signal and specific one of said GPS signal receivers, where each receiver-satellite-specific discriminant value is a function of the difference between corresponding ones of said receiver-satellite-specific GPS differential correction value and said satellite-specific GPS differential correction value associated with the same one of said satellite-specific information signals and specific one of said GPS signal receivers statistical value processing means for determining a receiver-satellite-specific statistical value descriptive of the corresponding behavior of each of said receiver-satellite-specific discriminant values detection threshold processing means operative for calculating at least a satellite-specific detection threshold value as a function of a selected false detection probability and corresponding receiver-satellite-specific statistical value; and ground station integrity monitoring means for determining satellite-specific integrity information, associated with each of said satellite-specific information signals and corresponding satellite-specific GPS differential correction values, as a function of said receiver-satellite-specific statistical value, said satellite-specific detection threshold value, and the number of operating GPS signal receivers.

11. The differential satellite positioning system ground station of claim 10 where said receiver-satellite-specific statistical value is descriptive of the behavior of said receiver-satellite-specific integrity discriminant values sampled over a selected time period.

12. A differential satellite positioning system ground station for determining GPS differential correction information with integrity monitoring, said differential satellite positioning system ground station comprising:

a plurality of GPS signal receivers, each at a known geocentric position, each operative for receiving a satellite-specific information signal transmitted from each of selected ones of a plurality of satellite vehicles, and each operative for deriving from each of said received satellite-specific information signals from said satellite vehicles receiver-satellite-specific GPS signal information;

differential correction processing means for determining a receiver-satellite-specific differential correction value associated with each of said selected satellite information signals;

averaging means for determining a satellite-specific average value of said receiver-satellite-specific differential correction values associated with a mutually exclusive one of said satellite information signals;

discriminator means responsive to receiver-satellite-specific differential correction values and said satellite-specific differential correction average values for determining a receiver-satellite-specific discriminant value;

means for determining a statistical value representative of the behavior of said discriminant values; and integrity monitoring means responsive to said discriminant values and said statistical values for deriving selected integrity information as one or more selected functions thereof.

* * * * *